United States Patent [19]

Yu

[11] Patent Number: 5,880,678
[45] Date of Patent: Mar. 9, 1999

[54] WARNING DEVICE FOR MONITORING ROTATION SPEED OF PRIME MOVER

[75] Inventor: Shou-Te Yu, Taoyuan Hsien, Taiwan

[73] Assignee: Delta Electronics, Inc., Taoyuan Hwen, Taiwan

[21] Appl. No.: 878,024

[22] Filed: Jun. 18, 1997

[51] Int. Cl.⁶ .................................................. G08B 21/00
[52] U.S. Cl. ........................................ 340/671; 340/648
[58] Field of Search ................................. 340/671, 679, 340/648, 661; 318/490; 324/177; 361/23, 33, 51, 90

[56] References Cited

U.S. PATENT DOCUMENTS 5,534,854  7/1996  Bradbury et al. ..................... 340/648

*Primary Examiner*—Thomas J. Mullen, Jr.
*Attorney, Agent, or Firm*—Lackenbach Siegel Marzullo Aronson & Greenspan, P.C.

[57] ABSTRACT

A warning device for monitoring the rotational speed of a prime mover which includes: a) a converting unit electrically connected to the prime mover for converting a digital signal representative of the rotational speed of the prime mover to an analog voltage; b) a reference unit for providing a specific analog reference voltage corresponding to the digital signal; c) a comparison unit for comparing the analog voltage with the specific analog reference voltage and generating a comparison signal when the analog voltage is not equal to the specific analog reference voltage; and d) an output unit electrically connected to the comparison unit for generating an alarm signal in response to the comparison signal.

10 Claims, 2 Drawing Sheets

WARNING DEVICE FOR MONITORING ROTATION SPEED OF PRIME MOVER

FIELD OF THE INVENTION

The present invention is related to a warning device for monitoring the rotational speed of a prime mover and generating an alarm signal to inform and prevent a system having an emergency measure from being burned down or in creating other trouble when the prime mover cannot operate under a normal condition or efficiently dissipate heat.

BACKGROUND OF THE INVENTION

A conventional warning device for monitoring a the rpm or speed of a motor internally set up in a system generates an alarm signal to notify the system only when the motor completely stops. Therefore, when the motor is influenced by an external factor or others, there is no alarm signal output when the rotational speed of the motor increases or decreases but does not completely stop. During this period, the motor cannot efficiently dissipate heat so that the system is burned down or will be in trouble due to a heat dissipating problem and no alarm signal having been generated.

FIG. 1 is a block diagram showing a circuit of the conventional warning device for monitoring the rotational speed of the motor which includes a direct current (DC) fan 1, a fan-stopping detector 2, a drive IC (integrated circuit) 3, and an output circuit 4. The fan-stopping detector 2 generates a signal to the drive IC 3 for providing an alarm signal to notify the system having an emergency measure when the motor completely stops. As a warning device like this is influenced by an external factor or others, there is no alarm signal output when the rotational speed increases or decreases but does not completely stop. During this period, the motor cannot efficiently dissipate heat which results in that the system is burned down or put out of order. The present invention can inform the system to take an emergency measure when the rotational speed of the motor increases or decreases because the motor cannot efficiently dissipate heat or operate under a normal condition.

SUMMARY OF THE INVENTION

An object of the present invention is to provide a warning device for monitoring a rotational speed of a prime mover. According to the present invention, a warning device includes: a) a converting unit electrically connected to the prime mover for converting the digital signal representative of the rotational speed of the prime mover to an analog voltage; b) a reference unit for providing a specific analog reference voltage corresponding to the digital signal; c) a comparison unit for comparing the analog voltage with the specific analog reference voltage and generating a comparison signal when the analog voltage is not equal to the specific analog reference voltage; and d) an output unit electrically connected to the comparison unit for generating an alarm signal in response to the comparison signal.

In accordance with one aspect of the present invention, the prime mover is preferably a motor.

In accordance with one aspect of the present invention, the prime mover is preferably a direct current (DC) fan motor.

In accordance with another aspect of the present invention, the prime mover is preferably a motor driven device.

In accordance with another aspect of the present invention, the rotation speed of the prime mover is changed along with a surrounding temperature.

In accordance with another aspect of the present invention, the digital signal representative of a rotational speed of the prime mover is a digital square wave signal.

In accordance with another aspect of the present invention, the converting unit is preferably a converting circuit.

In accordance with another aspect of the present invention, the reference unit is preferably a reference circuit.

In accordance with another aspect of the present invention, the specific analog reference voltage is pre-set and is changed along with a surrounding temperature.

In accordance with another aspect of the present invention, the comparison unit is preferably a comparison circuit.

The present invention may best be understood through the following description with reference to the accompanying drawings, in which:

DETAILED DESCRIPTION OF THE PREFERRED EMBODIMENT

Figure 1:
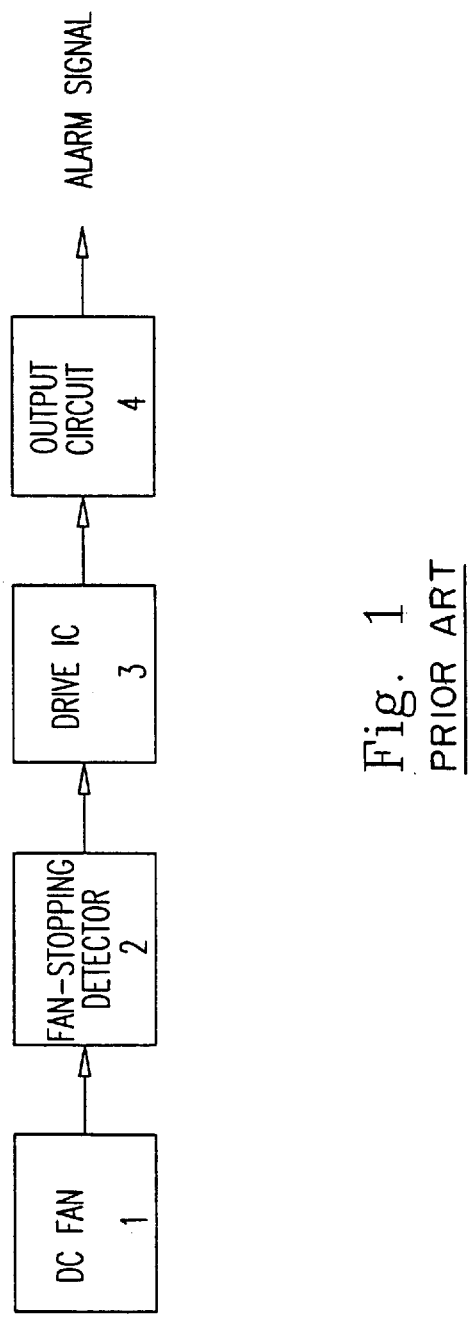
FIG. 1 is a block diagram showing a circuit of a conventional warning device for a rotational speed of a motor.
Figure 2:
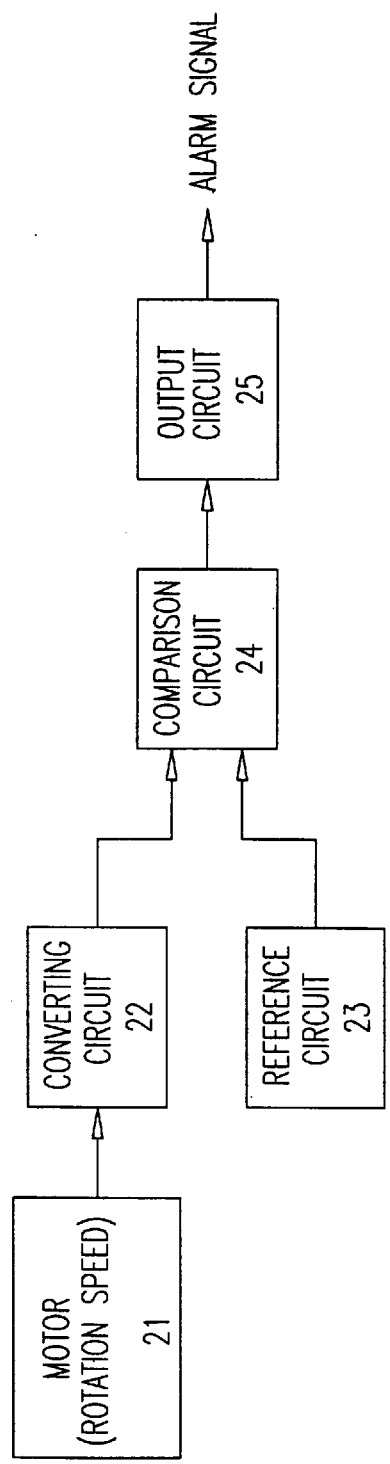
FIG. 2 is a block diagram showing a preferred embodiment of a warning device according to the present invention.

Please refer to FIG. 2 which comprises: a motor 21, a converting circuit 22, a reference circuit 23, a comparison circuit 24, and an output circuit 25.

As shown in FIG. 2, after the rotational speed of the motor 21 is converted to a digital square wave signal by a drive IC internally installed in the motor, the digital square wave signal is converted to an analog voltage through the converting circuit 22. On the other hand the reference circuit 23 can provide a specific analog reference voltage to be output to the comparison circuit 24. After comparing the analog voltage with the specific analog reference voltage, the comparison circuit will generate a comparison signal to be input to the output circuit 25. As long as the analog voltage is less than or greater than the specific analog reference voltage, the output circuit will generate an alarm in response to the comparison signal.

The specific analog reference voltage can be changed along with the surrounding temperature, this is, there are different specific analog voltages preset corresponding to different temperatures. As long as the analog voltage is less than or greater than the specific analog reference signal, the warning device can immediately generate an alarm signal to inform a system incorporating therein motor 21 to take a proper safety-guarding measure according to the specific environment temperature.

To sum up, the present invention can generate an alarm when the rotational speed of the motor is lower or higher than a specified rotation speed in order that a system can take a preventive measure to prevent from being burned down or in creating other trouble as long as a motor cannot efficiently dissipate heat or operate under a normal condition.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A warning device for monitoring a digital signal representative of a rotation speed of a prime mover comprising:

a converting unit electrically connected to said prime mover for converting said digital signal representative of said rotation speed of said prime mover to an analog voltage;

a reference unit for providing a specific analog reference voltage corresponding to said digital signal;

a comparison unit for comparing said analog voltage with said specific analog reference voltage and generating a comparison signal when said analog voltage is not equal to said specific analog reference voltage; and an output unit electrically connected to said comparison unit for generating an alarm signal in response to said comparison signal.

2. A device as claimed in claim 1, wherein said prime mover is a motor.

3. A device as claimed in claim 1, wherein said prime mover is a direct current (DC) fan motor.

4. A device as claimed in claim 1, wherein said prime mover is a motor driven device.

5. A device as claimed in claim 1, wherein said rotation speed of said prime mover is changed along with a surrounding temperature.

6. A device as claimed in claim 1, wherein said digital signal representative of said rotation speed of said prime mover is a digital square wave signal.

7. A device as claimed in claim 1, wherein said converting unit is a converting circuit.

8. A device as claimed in claim 1, wherein said reference unit is a reference circuit.

9. A device as claimed in claim 8, wherein said specific analog reference voltage is pre-set and is changed along with a surrounding temperature.

10. A device as claimed in claim 1, wherein said comparison unit is a comparison circuit.

* * * * *